April 16, 1946.  C. S. ASH  2,398,348
DUAL WHEEL VEHICLE
Filed Jan. 28, 1942  4 Sheets-Sheet 1

INVENTOR
CHARLES S. ASH
BY
Morgan, Finnegan + Durham
ATTORNEYS.

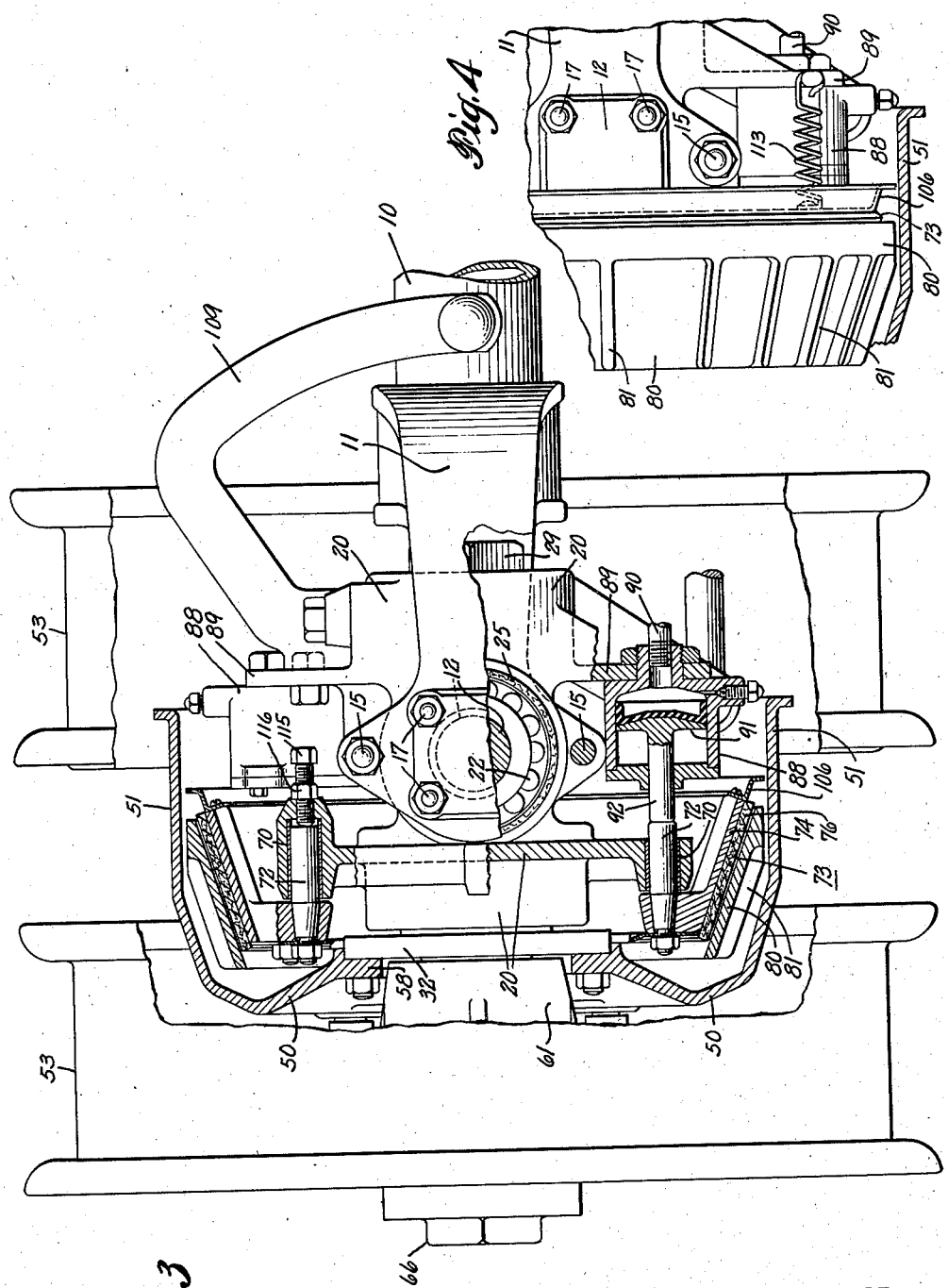

April 16, 1946.  C. S. ASH  2,398,348
DUAL WHEEL VEHICLE
Filed Jan. 28, 1942  4 Sheets-Sheet 4

INVENTOR
CHARLES S. ASH
BY
Morgan, Finnegan + Durham
ATTORNEYS.

Patented Apr. 16, 1946

2,398,348

UNITED STATES PATENT OFFICE 2,398,348

DUAL WHEEL VEHICLE

Charles S. Ash, Milford, Mich.

Application January 28, 1942, Serial No. 428,539

7 Claims. (Cl. 280—96.3)

The present invention has for its object the provision of novel and improved dual wheel assemblies for automotive vehicles, and more particularly novel and improved dirigible dual wheels for automotive vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 3 is a sectional view taken on the line 3—3 of Figure 2;

Figure 4 is a fragmentary detail view of a portion of the inner wheel brake, the outer wheel brake being broken away.

Figure 1:
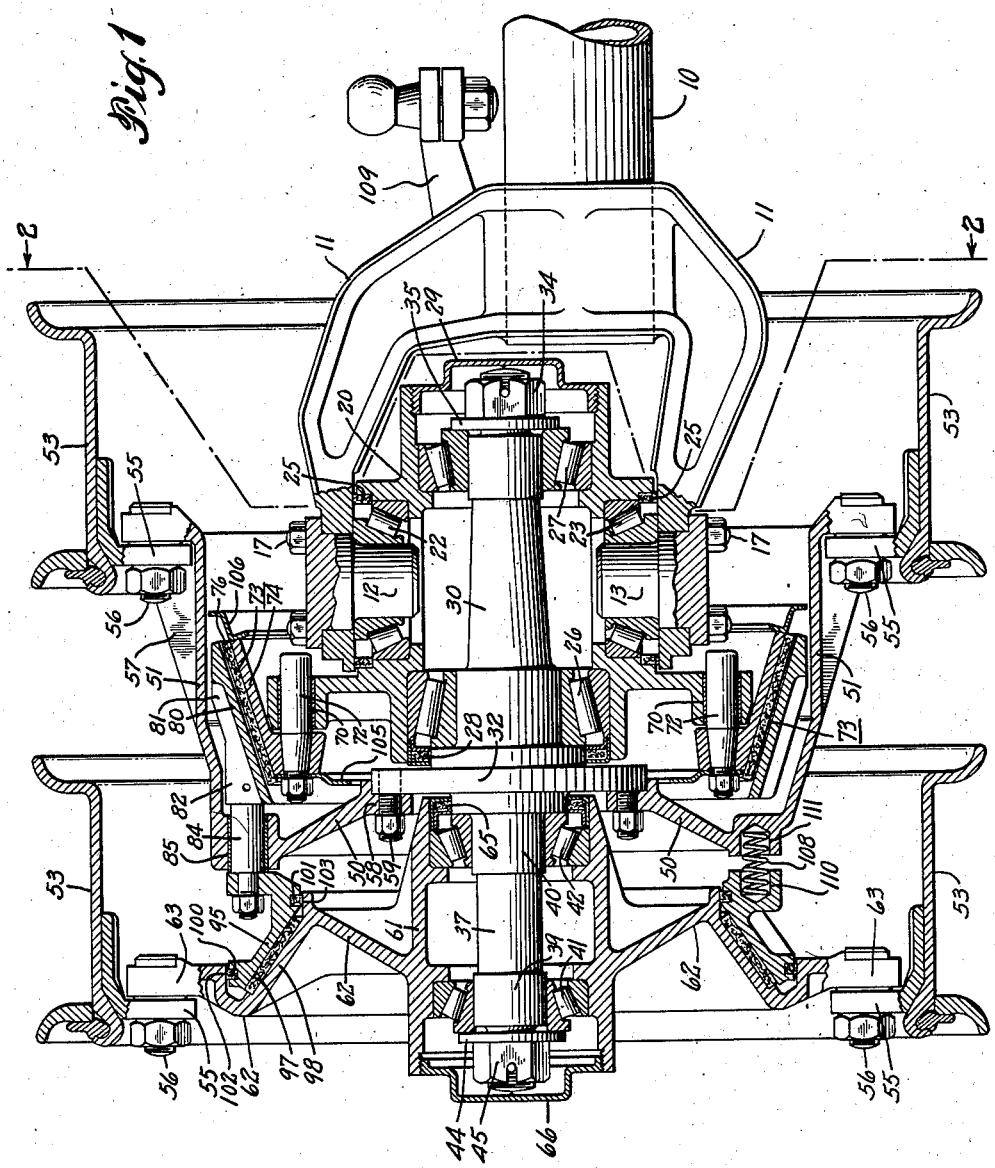
Figure 1 is a vertical sectional view showing a typical and illustrative embodiment of the present invention.
Figure 2:
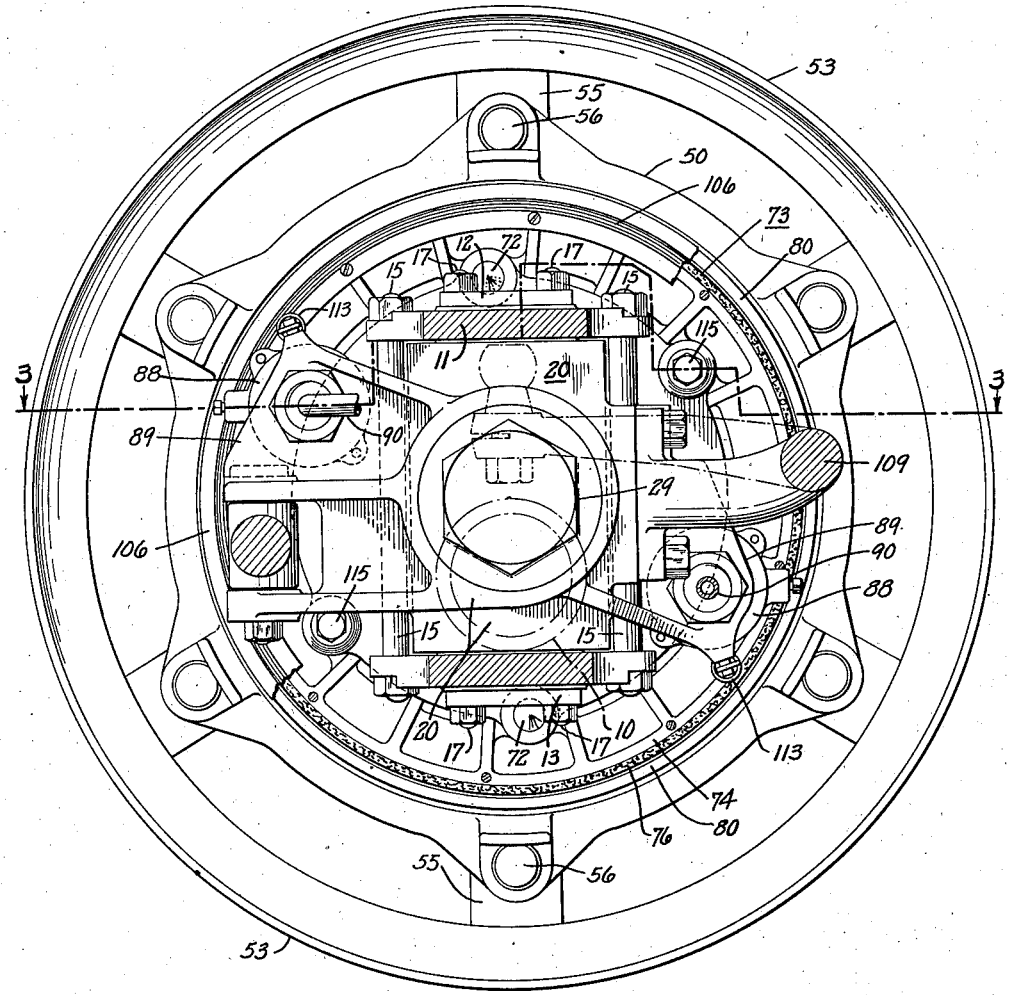
Figure 2 is a sectional view taken on the line 2—2 of Figure 1.

The present invention has for its object the provision of a novel and improved dual wheel construction particularly adapted for use with automotive vehicles carrying heavy loads. A further object of the invention is the provision of an improved dirigible, dual automotive wheel construction in which greater stability is provided and in which separate bearings are provided for each of the dual wheels. Another object of the invention is the provision of a dirigible dual wheel assembly which is compact, utilizes bearings of relatively small diameter, and may be provided with ample brakes of relatively small diameter. Still another object of the invention is the provision of an improved dirigible dual wheel construction in which the bearings for the outer wheel and at least one of the bearings for the inner wheel are contained within the planes defined by the inner and outer sides of the outer and inner wheels respectively, and in which the bearings may be divided on either side of the pivotal dirigible mounting for the dual wheels.

In accordance with a typical embodiment of the invention, illustrated as applied to dirigible dual wheels, there are provided a pair of side-by-side, relatively rotatable, dual wheels which have free independent rotation and are adapted to be used at the ends of a front axle of an automotive vehicle. One of the dual wheels is provided with a spindle which is mounted for rotation by an inwardly projecting portion which is journaled in spaced apart bearings, one on either side of the vertical axis about which the wheels are to be dirigibly moved, the bearings being mounted at an end of the axle. The spindle is also formed with an outwardly extending portion on which the outer wheel is rotatably journaled and means are provided preventing relative axial movement of the wheels on their spindle, as well as with respect to the axle end.

The dirigible axis is preferably positioned so that its projection intersects the road at a point between the inner side of the inner wheel and the outer side of the outer wheel, and may be tilted or not for camber or castor, as desired.

Suitable braking means are provided for retarding or stopping the rotation of the wheels to thereby stop the vehicle, and for this purpose a brake drum is mounted on each of the wheels and cooperates with suitable braking means which may be actuated in any desired manner, as hydraulically. Preferably, and to give the maximum braking area consistent with the proper spacing of the brakes from the tire rims, the braking members are frustro-conical and are actuated by axial movement of one of the members relatively to the other.

As embodied, actuation of the braking means for one of the wheels causes a simultaneous brake actuation of the other wheel brake, and suitable means are provided for properly proportioning the braking effort between the wheels, insuring adequate braking of both wheels, at the same time not interfering with the continued relative rotation of the wheels even when the brakes are applied with a considerable degree of force.

It will be understood that the foregoing general description and the following detailed description as well are exemplary and explanatory of the invention but are not restrictive thereof.

Referring now in detail to the accompanying drawings illustrating the preferred embodiment of the invention, and suitable for use as the dirigible front wheels of a heavy-duty truck or tractor, there is provided a front axle 10 of conventional form at each end of which is provided a yoke 11. Seated in the ends of the yoke 11 and extending in axial alinement are king pin bearing studs 12 and 13, removably secured to the yoke by means of the tie bolts 15 and the smaller bolts 17.

Dirigibly mounted by means of the pins 12 and 13 is a combined bearing sleeve and brake anchor which comprises a hollow member 20 provided with bearing seats to receive the tapered roller bearings 22 and 23 by which the member is dirigibly mounted on the king pin studs 12 and 13. Lubricant retaining washers 25 are also provided for retaining lubricant within and excluding dust from the bearings 22 and 23.

Sleeve member 20 is also provided with bearing seats in horizontal alinement near each of its ends to receive the wheel spindle tapered roller bearings 26 and 27, and at its inner end it is threaded to retain the bearing cap 29, while the outer end of the sleeve is closed by means of the lubricant retaining washer 28.

The wheel spindle comprises a relatively long spindle 30 having an intermediate flange 32 to which the inner wheel is bolted, and an inwardly projecting axial portion which is finished to provide seats for the inner races of bearings 26 and 27, while its inner end is threaded to receive the castellated nut 34 and bearing washer 35, by which the spindle is held against axial movement with respect to its bearings.

As illustrated, one of the bearings, 27, is positioned inwardly of the king pins 12, 13, while the other bearing 26 is positioned at the outer side of these king pins, thereby spacing the bearings 26, 27 apart and minimizing the radial loading of the bearings as the vehicle is driven over rough terrain or roads.

The spindle 30 also projects outwardly of the flange 32 to provide a portion 37 on which the outer wheel is rotatably mounted. Spindle portion 37 is formed with spaced apart bearing seats 39 and 40 on which are received the tapered roller bearings 41 and 42 by which the outer wheel is mounted for rotation, and these bearings are held against axial movement by means of the bearing washer 44 and castellated nut 45.

The inner wheel illustratively comprises a radially extending web portion 50 which is integral with a cylindrical drum 51, outwardly flanged at its inner end and provided with means for attaching a pneumatic tire rim 53 thereby, as by the lugs 55 and the bolts 56. The drum portion 51 of the wheel may be ribbed, as at 57, to increase its strength, and the radially innermost portion is provided with a flange 58 to fit over the intermediate flange 32 and is mounted securely thereon by means of the bolts 59.

The outer wheel illustratively comprises a hub portion 61 to which is integrally formed an intermediate or web portion 62 which is provided around its periphery with a plurality of rim mounting seats 63 to which the rim lugs 55 of the outer tire rim may be bolted by bolts 56, the inner and outer rims 53 preferably being duplicates of each other. The interior of the hub is formed with bearing seats in which the outer races of bearings 41 and 42 are received, the inner end of the hub is provided with a lubricant retaining washer 65, while the outer end of the hub is closed by means of the threaded hub cap 66, so that lubricant may be retained around the bearings 41 and 42.

While various forms of brakes may optionally be used with the dual wheels of the present invention, they are preferably of the form and construction shown in the accompanying drawings, and more completely described and claimed in my copending application, Serial No. 428,540 now Patent No. 2,331,159 issued October 5, 1943.

The sleeve like spindle supporting member 20 is provided at its outer end with a radially extending brake anchor portion which clears the upper and bottom ends of the yoke 11. A plurality of parallel, axially extending apertures 70 are formed in the brake anchor portion, preferably at a uniform distance from the axis of the spindle and are bushed to receive the plurality of guide rods 72 by which the brake shoe 73 is supported and mounted for axial movement. The brake shoe 73 comprises a frustro-conical member 74, the outer face of which is covered with moulded brake lining 76, while the smaller, outer end of the member 74 extends inwardly and is apertured to be bolted to the tapered ends of the guide rods 72, thereby permitting only axial movement of the brake shoe 73.

The brake drum for the inner wheel comprises a correspondingly tapered frustro-conical member 80 having a finished inner surface and provided on its exterior with strengthening ribs 81, as well as with sockets 82 in which are received the axially extending, evenly spaced guide rods 84 which are slidable in the bushed apertures 85 formed in the web portion 50 of the inner wheel. The brake drum 80 may thus move towards the wheel web 50 but is always maintained coaxial with the brake shoe 73 and a full contact is obtained between the brake shoe and drum when the two are moved relatively towards each other.

Means are provided for actuating the brake and comprise the hydraulic cylinder 88 which is mounted on a depending portion 89 of the sleeve and brake anchor and is in communication with the hydraulic line 90. Within the cylinder 88 is a piston 91 connected to the piston rod 92 which bears against the inner end of a guide rod 72 so that application of hydraulic pressure to the piston 91 forces the brake shoes 73 axially outwards to engage it with the brake drum 80. A plurality of the hydraulic cylinders may be provided and are preferably arranged symmetrically so as to distribute the braking pressure uniformly.

Means are also provided for transferring the braking pressure to the outer wheel and for braking the outer wheel. As embodied, the outer wheel brake comprises a frustro-conical brake drum 95 mounted at and by the outer ends of the guide rods 84 so that it is coaxial with the outer wheel 62. Brake drum 95 is adapted to contact with and frictionally engage the complementary brake shoe formed by the brake lining 97 mounted on the frustro-conical portion 98 of the outer wheel web 62. The outer brake drum 95 and shoe are forced into contact with each other by the hydraulic force transmitted from the hydraulic pistons 91, transmitted through the inner brake shoe 73, the inner brake drum 80, and the guide rods 84 to the outer brake drum 95.

By varying the relative area of the inner and outer wheel brakes, by varying the taper of the inner and outer brake shoes and drums and by varying the materials of which these parts are made, the relative degree of braking applied to the two dual wheels may be predetermined, but they are preferably so designed, and are so shown that an equal braking force is applied to each of the two wheels.

For keeping excessive dust and other foreign matter from the brakes, the outer brake drum is provided with dust washers 100, 101 which are carried in grooves in the brake drum and slide on cylindrical surfaces 102, 103 on the inner face of the outer wheel. The inner wheel brake is similarly guarded against dust by means of the dust plate 105 carried by the guide rods 72 and the dust plate 106 mounted on the brake anchor plate 20.

Any suitable means may be provided for dirigibly moving the dual wheels about their king pins 12 and 13, and for this purpose a steering arm 109 is bolted to the sleeve member 20 and may be connected to the tie rod or pitman in the usual manner.

Means are provided for disengaging the brake drum 80 from its brake shoe 73, and for this purpose springs move the brake drum 80 until the brake drum 95 is lightly in contact with its brake shoe 98. These springs comprise coil springs 108 mounted in recesses 110 formed in the brake drum 95 and alined recesses 111 in the wheel web 50. Other means are provided for retracting the brake shoe 73 when the hydraulic pressure on piston 91 is relieved and comprise the tension springs 113, each having one end connected to the brake shoe 73 and its other end connected to the brake anchor plate 20 and inwardly of the wheels.

Adjustable stop means limit the inward movement of the brake shoe 73 and comprise the set screw 115 threaded into certain of the bushed apertures 70 and held against accidental movement by means of the jamb nuts 116.

In the operation of the embodiment illustrated in Figures 1 to 4, the inner wheel 50 is mounted for rotation by means of the live spindle 30 which is rotatably journaled with respect to the axle 10 and has dirigible movement by virtue of the king pin bearings 22, 23 which tend to hold the spindle in a substantially horizontal position. The outer wheel 62 is mounted for coaxial relative rotation and to this end is journaled on the outer end of the spindle 30. Thus the wheels have free independent rotation, each on its own bearings of relatively small diameter and by which they are held in coaxial relation with a fixed spacing.

Due to the smaller diameter of the bearings, greater clearance is afforded with respect to the front axle and a shorter turning radius may be had than has heretofore been the case. Furthermore, the brake structure may be mounted outwardly of the king pin mounting, so as to further increase the sharpness with which the wheels may be steered.

Normally, the brake members 95 and 97 are in light contact with each other, while the brake members 73 and 80 are out of contact with each other. Thereby, no hindrance is offered to the conjoint rotation of the wheels, minimizing brake wear, and only a minimum of resistance is offered to the relative rotation of the wheels, which causes only negligible wear due to the relatively small amount of such relative rotation.

When pressure is applied to the hydraulic cylinder, the piston 91 is moved outwardly pressing the brake shoe 73 into engagement with the brake drum 80 and simultaneously pressing the brake drum 95 against the brake lining 97 with an equal pressure, thereby applying an equal braking effort to both wheels and retarding both wheels, while at the same time permitting independent or relative rotation. As the hydraulic pressure is relieved, springs 113 disengage the brake members 73, 80 moving the guide rods 72 against their stops 115, and at the same time relieving the powerful pressure of the brake drum 95 against its brake lining 97, thereby once again permitting free rotation of both wheels.

Figure 5:
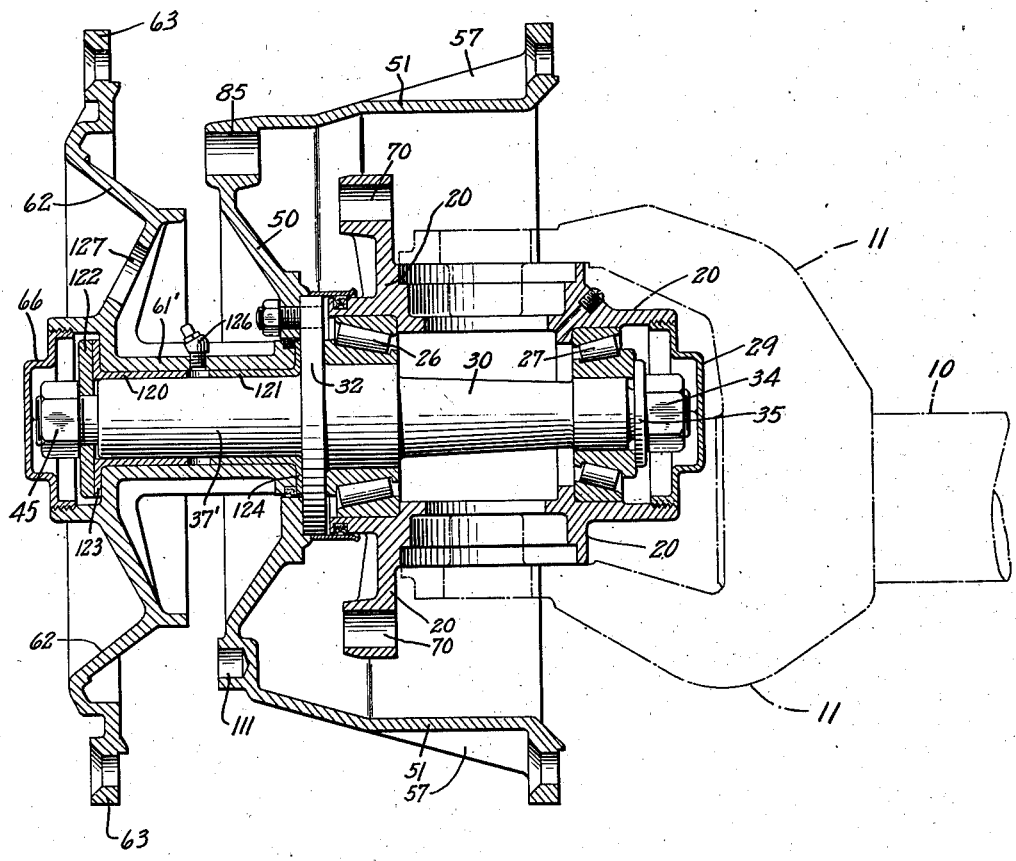
Figure 5 is a vertical sectional view, with the rims and tires omitted, of a modified embodiment of the present invention.

Figure 5 of the drawings illustrates a modified embodiment of the wheel structure, no brakes or rims being shown, and in many respects the parts are duplicates of those described above. As illustrated, the outer wheel is mounted for relative rotation with respect to the inner wheel and its spindle by means of radial and thrust bushings. As embodied, the hub 61' of the outer wheel is of generally cylindrical form and carries the spaced bushings 120, 121 which journal the hub on the cylindrical spindle extension 37', while thrust bushings 123, 124 are provided for taking the end thrust of the one wheel relative to the other. A washer 122 is provided between the castellated nut 45 and the bushing 123, while the bushing 124 lies between the inner end of the hub 61' and the outer face of the intermediate spindle flange 32. A grease fitting 126 is provided communicating with the annular channel between the bushings 120, 121 and is accessible through an aperture 127 in the wheel web 62'.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel construction including in combination a pair of side by side, coaxial wheels, a spindle to which one of the wheels is fastened, a pair of spaced apart bearings, a sleeve in which the spindle is rotatably mounted by said bearing at the inner portion of the spindle and a second pair of spaced apart bearings by which the other wheel is rotatably mounted on the outer portion of the spindle.

2. A dual wheel construction including in combination a pair of side by side, coaxial wheels, a spindle to which one of the wheels is fastened at an intermediate point, a pair of spaced apart bearings, a sleeve in which the spindle is rotatably mounted at one of its ends by said bearings and a second pair of spaced apart bearings by which the other wheel is rotatably mounted on the other end of the spindle.

3. A dual wheel construction including in combination a pair of side by side, coaxial wheels, a spindle to which one of the wheels is fastened at an intermediate point, a pair of spaced apart bearings, a sleeve in which the spindle is rotatably mounted at one of its ends by said bearings and a second pair of spaced apart bearings by which the other wheel is rotatably mounted on the other end of the spindle the first wheel being deeply dished to overlie a major portion of one spindle end, whereby the bearings in the sleeve are generally in line with the road engaging portion of that wheel.

4. A dual wheel construction including in combination a pair of side by side, coaxial wheels, a spindle to which one of the wheels is fastened at an intermediate point, a pair of spaced apart bearings, a sleeve in which the spindle is rotatably mounted at one of its ends by said bearings and a second pair of spaced apart bearings by which the other wheel is rotatably mounted on the other end of the spindle the first wheel being deeply dished to overlie a major portion of one spindle end, whereby the bearings in the sleeve are generally in line with the road engaging portion of that wheel and the other wheel being shaped to position its bearings on the spindle generally in line with the road engaging portions of said other wheel.

5. In a dual wheel vehicle, the combination of an axle, a bearing support dirigibly mounted on a substantially vertical axis at an end thereof, a pair of side by side wheels, a spindle on which one of the wheels is rotatably mounted at one end of the spindle and to which the other wheel is fast at an intermediate portion and horizontally spaced apart bearings for the other end of the spindle, rotatably mounting the spindle in the dirigible support, said axis being intermediate said bearings.

6. In a dual wheel vehicle, the combination of a spindle having a dished wheel fast to an intermediate portion, a member in which the spindle is rotatably supported by one of its ends, a second wheel rotatably journaled on the other end of the spindle and a king pin mounting for the spindle supporting member within the dish of the first wheel.

7. In a dirigible dual wheel construction, in combination with a yoked axle and spaced apart pivot means for dirigible movement of a pair of dual wheels, a hollow bearing supporting member dirigibly supported between said pivot means and extending substantially inwardly thereof axially of said wheels, a spindle rotatably supported within said member and having a flange portion adapted to fixedly mount the inner of the dual wheels, said spindle further extending outwardly beyond said flange portion whereby it is adapted to rotatably mount the outer of said wheels.

CHARLES S. ASH.